US006535650B1

(12) United States Patent
Poulo et al.

(10) Patent No.: US 6,535,650 B1
(45) Date of Patent: Mar. 18, 2003

(54) CREATING HIGH RESOLUTION IMAGES

(75) Inventors: Richard J. Poulo, Beaverton, OR (US); Vu X. Nguyen, Hillsboro, OR (US); Vareck S. Bostrom, Aloha, OR (US); Walter L. Gorman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/120,257

(22) Filed: Jul. 21, 1998

(51) Int. Cl.⁷ .................................................. G06K 9/36
(52) U.S. Cl. ........................................ 382/284; 382/294
(58) Field of Search ................................ 382/284, 285, 382/287, 154, 289, 276, 294, 295, 296, 298, 299, 277, 278, 282, 293; 345/418, 419, 425, 435, 437, 438, 427

(56) References Cited

U.S. PATENT DOCUMENTS

| | | | | |
|---|---|---|---|---|
| 5,550,937 A | * | 8/1996 | Bell et al. ................... 382/293 |
| 5,590,261 A | * | 12/1996 | Sclaroff et al. .............. 395/173 |
| 5,696,848 A | * | 12/1997 | Patti et al. ................... 382/254 |
| 5,706,416 A | * | 1/1998 | Mann et al. .................. 395/127 |
| 5,798,761 A | * | 8/1998 | Isaacs .......................... 345/419 |
| 5,907,626 A | * | 5/1999 | Toklu et al. ................. 382/107 |
| 5,973,700 A | * | 10/1999 | Taylor et al. ................ 345/427 |
| 5,999,662 A | * | 12/1999 | Burt et al. ................... 382/284 |
| 6,018,349 A | * | 1/2000 | Szeliski et al. .............. 345/425 |
| 6,075,905 A | * | 6/2000 | Herman et al. .............. 382/284 |

* cited by examiner

*Primary Examiner*—Bhavesh Mehta
*Assistant Examiner*—Kanji Patel
(74) *Attorney, Agent, or Firm*—Trop, Pruner & Hu, P.C.

(57) ABSTRACT

A digital imaging system includes a camera to capture a plurality of images representing a scene. A program is executable on the processor to align the images with respect to a reference image and to combine the images into a composite image that represents the scene. The camera may include a low resolution camera, and the composite image may be a high resolution, digitized image.

25 Claims, 8 Drawing Sheets

CREATING HIGH RESOLUTION IMAGES

BACKGROUND

The invention relates to creating high resolution images.

Digital image processing involves capturing, manipulating and analyzing digital information. A digital imaging device can capture optical images and convert them to digital format for further processing. In a typical digital imaging system, optical components may be used to focus an optical image onto an array of pixel sensors that electrically capture the image and output analog signals, which are then converted by analog-to-digital converters into digital signals for further processing.

High resolution digital image acquisition is typically available in many types of image scanning devices, including copy machines, facsimile machines, document scanners, electronic white boards, and cameras that use either film or high resolution digital sensors. In such devices, to accurately capture fine detail in text, a photograph, or a drawing, high resolution image acquisition equipment is needed.

An optical image is a continuously varying array of shades and colors. In a digitization process, an image may be sampled into a rectangular array of pixels, with each pixel having an (x, y) coordinate that corresponds to its location within the image. The number of pixels in a digital image depends on how finely the image is sampled.

A digital camera's cost is a function of its resolution. The higher its resolution the more expensive the digital camera. For example, to capture an 8½×11 document using a 300-dots-per-inch (DPI) scan requires an image resolution of 2550×3300 pixels. Inexpensive digital cameras (including still-shot cameras and video cameras) have resolutions far below this and thus cannot capture images with the desired detail.

Thus, a need arises for a technique and mechanism to generate high resolution images using low resolution digital imaging devices.

SUMMARY

In general, in one embodiment, the invention features a digital imaging system that includes a camera to capture a plurality of images representing a scene, a processor, and a program executable on the processor to align the images with respect to a reference image and to combine the images into a composite image that represents the scene.

Other features of the invention will become apparent from the following description and from the claims.

DETAILED DESCRIPTION

Figure 1:
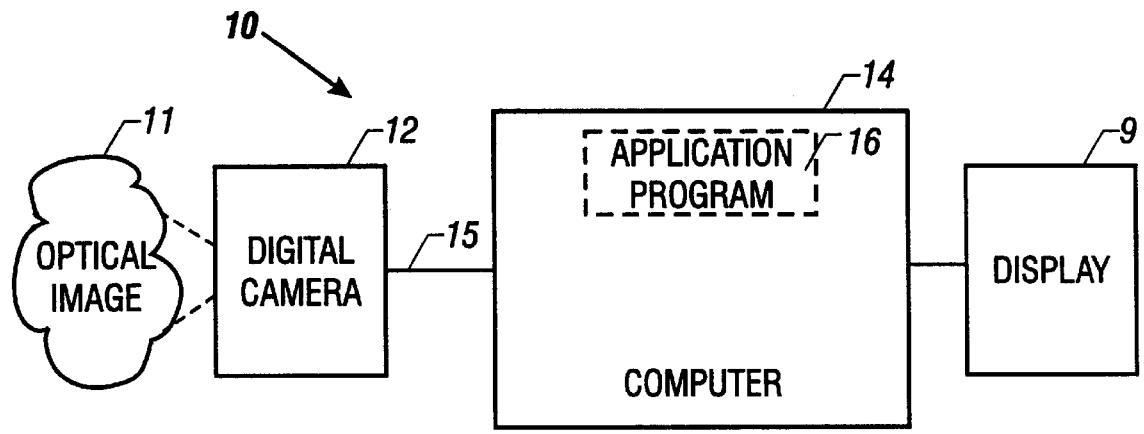
FIG. 1 is a block diagram of a digital imaging system that runs an application program according to an embodiment of the invention.

Referring to FIG. 1, in a digital imaging system 10 that includes a program 16 according to an embodiment of the invention, a digital camera or other suitable imaging device 12 (which may be a video camera or still-shot camera) captures multiple optical images 11. The camera 12 transmits streams of data representing the images (stored as frames of pixel data) to a computer 14 over a communications link 15 (which may be a serial link, for example). The digital camera 12 may be a low resolution camera. The computer 14 may then execute the application program 16 to process the captured images. According to an embodiment of the invention, under control of the application program 16, the computer 14 can combine ("stitch") multiple frames of low resolution, digitized images together to form a high resolution composite image.

Alternatively, the application program 16 can be loaded and run in the digital camera 12 or on a device connected over a network (including a local area network, wide area network, or the Internet). Further, a portion of the application program 16 may be run in the digital camera 12 while another portion may be run in the computer 14.

To create a high resolution image using images captured by the low resolution camera 12, the camera 12 is scanned back and forth across a target scene (which may be, for example, a natural scene, a page of text, or another target). The camera 12 is focused on small parts of the overall scene while the camera is scanned to capture the entire scene. The captured low resolution images are then processed and stitched together by the application program 16 ("stitching program") according to embodiments of the invention to create a high resolution composite image that represents the entire target scene. Key parts of the stitching process include aligning the captured frames and matching overlapping regions of the different frames of the scene. To accurately match the regions in the multiple images, the stitching program 16 compensates for misalignment or distortion resulting from motion of the camera caused by unsteady movement of the camera support, which may be, for example, a user's hands.

There are six degrees of freedom of motion of a camera, these being the three independent axes of motion (x,y,z) and the three independent rotations about those axes. Thus, given any two overlapping images about which nothing is known regarding the relative positions of the camera when capturing the two images, the six-dimensional space must be searched to match the overlapping pixels of the two images.

The stitching program 16 in one embodiment receives successive video frames that have been taken by the camera 12 at a predetermined rate as the camera 12 is swept over the scene to be captured. Using a capture rate of as little as about two frames per second, for example, may be sufficient to reduce the region to be searched in six dimensional space down to a feasible size. Using the example sampling rate, a frame is taken every one-half second. During that short time period, the camera 12 may be moved and rotated by only a relatively small amount. As a result, this can reduce all rotations and movements to a value small enough such that a linear offset of only a small number of pixels is observed from one edge of one image to the edge of the subsequent image. Given such small movement between images, the application program 16 can accurately calculate how images are distorted or misaligned with respect to each other and adjust the images to correct for such distortions or misalignments.

Because of the relatively rapid rate of image capture as the camera 12 is scanned, successive images will have large amounts of image overlap. To properly combine or stitch the low resolution frames of images, all the captured frames may be aligned with respect to a reference frame to compensate for movement and rotation of the camera 12 as a target scene is being captured. This correction process ("alignment process") is accomplished using perspective transforms (or projective mapping) to adjust the pixel positions in each frame. In one embodiment, the perspective transforms map all captured frames back into the first captured frame. In an alternate embodiment, another frame can be chosen as the reference frame.

To perform the perspective transforms, mapping points in each frame are first identified. In one embodiment, four mapping points are selected in each frame. To accurately correlate these points in the frames, the mapping points are uniquely identifiable for each frame; that is, a mapping point should not be redundant. Another desired attribute of these mapping points is that they be found in "feature-rich" areas; that is, areas of high detail. Once the mapping points are identified, then the perspective transforms of all frames can be accurately performed using standard techniques known in the art.

After the alignment process, error correction may be performed. Because the perspective transforms are performed on a large number of frames, accumulated error may be significant. Such accumulated error is removed in the error correction phase.

Figure 2:
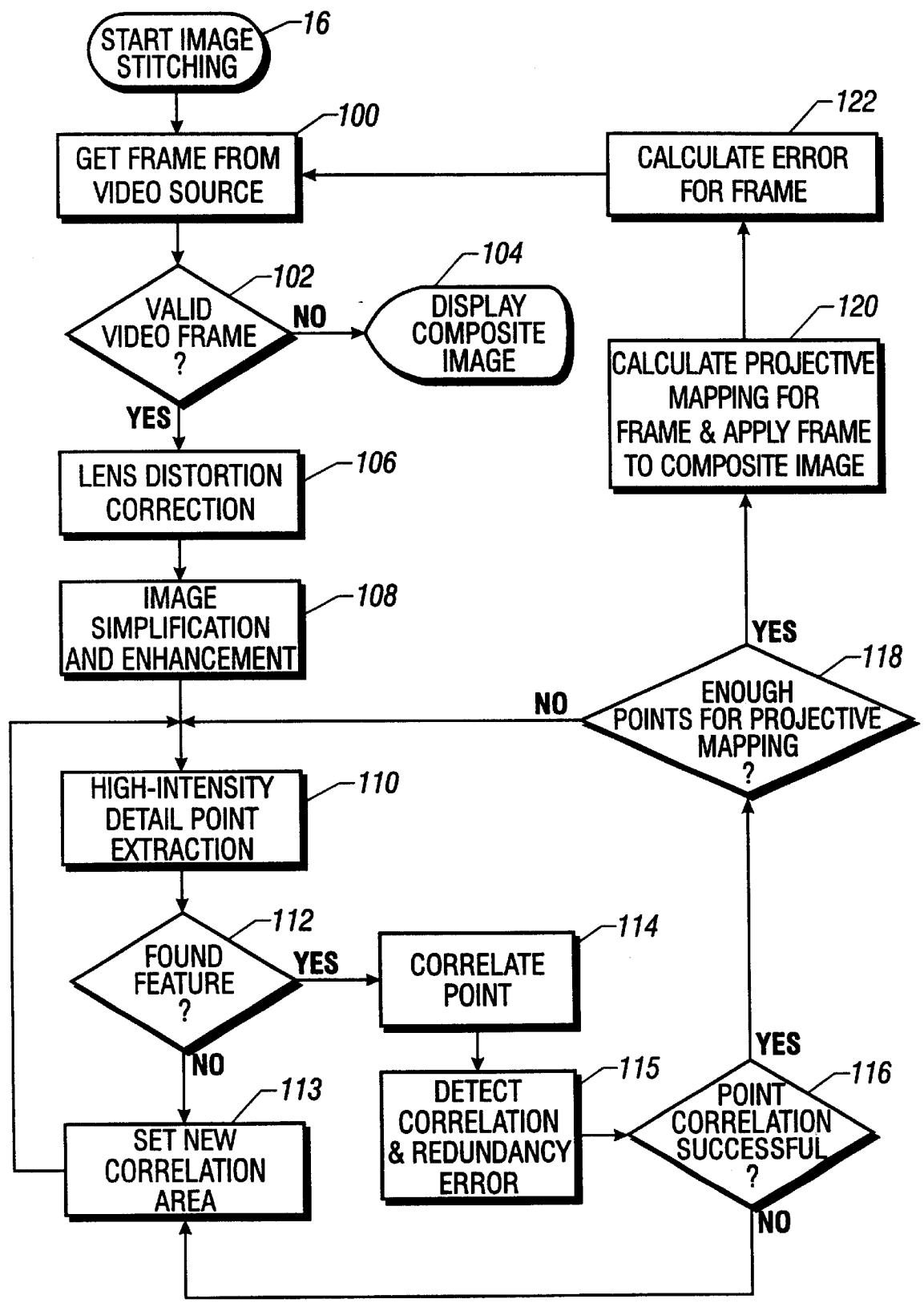
FIG. 2 is a flow diagram illustrating the application program of FIG. 1 that performs an image stitching process.

Referring to FIG. 2, the stitching program 16 according to an embodiment of the invention first receives a frame from a video source, such as the digital camera 12 (step 100). Next, the stitching program 16 determines if the frame is a valid video frame (step 102). This step essentially determines if the user has stopped capturing data, in which case incoming data has stopped and the image capture and stitching process is complete. At that time, the composite image is displayed on the video display of the computer system (step 104). However, if a valid video frame is received, the stitching program 16 may next perform pre-processing steps, including lens distortion correction (step 106) and image simplification and enhancement (step 108). An image may be distorted through lens operations and other non-linear effects. Camera lenses often have geometric distortions, including "pin cushion" distortion and "barrel" distortion. Many standard techniques exist to compensate for such distortions.

After distortion of the image has been corrected, image simplification and enhancement may be performed (step 108). For example, processing may be performed to remove image noise. Further, luminance distortion may be corrected to improve the image correlation process. Luminance distortion is the effect of a camera lens in changing the relative brightness of different parts of an image, for example, making the center of an image brighter than it should be relative to the edges. To correct luminance distortion, a small number of images of blank white paper may be captured and the average taken on a pixel-by-pixel basis over the multiple images. The average image may be converted to a gray scale image $\{p_{ij}\}$, from which a gray scale histogram may be calculated. From the histogram, a threshold white value $w_T$ may be calculated such that a predetermined percentage (e.g., 92%) of pixels in the image $\{p_{ij}\}$ have white values less than $w_T$. From $w_T$ and $\{p_{ij}\}$, an array $\{c_{ij}\}$ is defined according to Eq. 1.

$$\{c_{ij}\} = \frac{w_T}{\{p_{ij}\}} \qquad \text{(Eq. 1)}$$

To correct for luminance distortion, all captured frames that are to be stitched together may be multiplied by the array $\{c_{ij}\}$ on a pixel-by-pixel basis. Steps 106 and 108 are included in the pre-processing phase of the stitching process.

After the pre-processing phase, the alignment phase of the stitching process is performed to align the captured frames to compensate for the unknown relative positions of the camera 12 as it is used to capture the multiple images. The stitching program 16 identifies "feature-rich" image areas (step 110). In the image stitching process, "good" mapping points in an image are selected to properly map one image to another. Mapping points selected in one image are correlated to corresponding mapping points in another image. Poor choices in mapping points may result in missed correlation, resulting in incorrectly stitched images. As noted above, these mapping points are found in feature-rich areas. Thus, to select these mapping points, feature-rich areas are first identified. To determine what is a feature-rich area, the number of features in an image is first determined, followed by applying the measurement to find the feature-rich area.

To measure feature detail, a simplified edge detection scheme may be used in one embodiment. The measurement is defined as the summation of the absolute difference of a group of closely related pixels in both the x and y directions for a given correlation area, which is a small area (such as area A in FIG. 3) over which the feature-rich determination is made. For example, the correlation area A may be selected to be a region of 30×30 pixels. In one embodiment, a correlation area A is initially selected to be in a corner of the frame. If the initial correlation area is determined not to be feature-rich, then the correlation area A is moved according to a preselected path (e.g., path $R_1$ shown in FIG. 3) and the correlation process performed until a feature-rich area is identified.

The captured image is represented by a frame P and the parameters x and y represent the coordinates of pixels in the frame P. Thus, P(x, y) represents the pixel value at a certain (x, y) coordinate. To determine if the selected correlation area is a high-feature (or feature-rich) area, two variables H(x, y) and V(x, y) are defined according to Eqs. 2 and 3, in which H(x, y) represents the absolute horizontal pixel difference and V(x, y) represents the absolute vertical pixel difference.

$$H(x,y)=|P(x-1,y)-P(x+1,y)|, \qquad \text{(Eq. 2)}$$

$$V(x,y)=|P(x,y-1)-P(x,y+1)|, \qquad \text{(Eq. 3)}$$

From the H and V values, an edge detail value D of the correlation area may be calculated using Eq. 4, $$D = \sum_{i,j} H(i,j) + V(i,j), \qquad \text{(Eq. 4)}$$

in which variables i,j are bounded by the selected correlation area.

By calculating the edge detail D, the number of features in a region may be measured. After the edge detail value D is calculated for the selected correlation area the stitching program 16 then determines if the edge detail value D exceeds the minimum feature threshold value (step 112). A feature-rich area is a region where the measured detail level is greater than the minimum feature (or detail threshold) for correlation to be successful. This minimum threshold value can be preset and depends on the sensitivity of the correlation routine to the type of features found in an image. Once this threshold value is determined, a simple search over the image can be done to find an area that meets the threshold requirement.

In one embodiment, the detail threshold may be dynamically set to adapt to previous correlation passes. Feedback from prior correlations (failures or successes) indicate if the selected detail threshold level is adequate for correlation. The detail threshold level is decreased when correlation fails and increased when successful. Other ways of implementing this dynamic thresholding are also possible.

In an alternative embodiment, the calculation of the detail value D may be improved by eliminating image noise from the calculation of D. This may allow for consistency of values across images of different quality. Noise reduction may be performed by eliminating pixel differences less than a certain threshold value. The noise threshold may be based upon the type of application and the type of images a camera can capture. For example, if the captured image includes text, the noise threshold may be set high to eliminate areas with luminance irregularity problems and poor image quality (low signal-to-noise ratios). To eliminate image noise, Eqs. 5 and 6 may be used.

$$H(x,y)=0, \text{ if } H(x,y) \leq N\text{Threshold}, \qquad \text{(Eq. 5)}$$

$$V(x,y)=0, \text{ if } V(x,y) \leq N\text{Threshold}, \qquad \text{(Eq. 6)}$$

where Nthreshold may be the minimum pixel difference between any two pixels, which also is the noise threshold.

Figure 3:
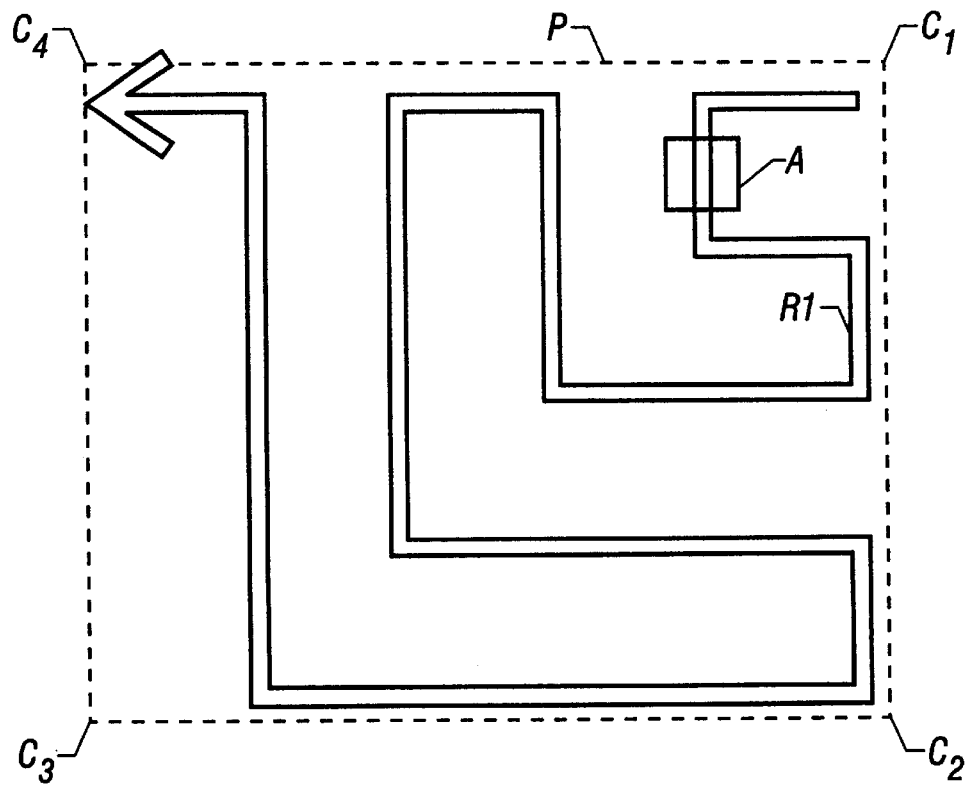
FIG. 3 illustrates a correlation path used by the image stitching process.

If the calculated detail value D is less than the minimum detail threshold (as determined in step 112), then a feature-rich area has not been found, and a new correlation area is selected along path $R_1$ or some variation of the path shown in FIG. 3 (step 113). The feature-rich area determination of steps 110 and 112 are then performed again. If the area is determined to be feature-rich, then a mapping point may be selected in the feature-rich area (step 114).

Most natural scenes have a high level of detail, so selecting a set of mapping points at fixed positions in each image may be sufficient for correct correlation. However, in the case of a text image or other types of low detail images, the detail within the captured image may be sparse. As a result, fixed point correlation may be unsuccessful. In some embodiments, fixed point correlation may be used, but other techniques for selecting mapping points may also be used such as that described below.

A mapping point is an area of an image that is uniquely identifiable from one image to another. According to one embodiment, the criteria for what constitutes a good set of mapping points and how to find those points are as follows: (1) points that have non-redundant feature-rich detail; and (2) points that are as far apart as possible in the image. According to one embodiment, the zigzag or spiral-shaped search pattern $R_1$ shown in FIG. 3 may be used.

In one embodiment, search patterns identical to the search pattern $R_1$ may start from each of the other corners of the frame P image to identify four mapping points. The pattern $R_1$ starts from corner $C_1$ of the frame P, while the other patterns $R_2$, $R_3$, and $R_4$ would start from corners $C_2$, $C_3$, and $C_4$, respectively.

To select the mapping point in the selected correlation area, the current frame $P_k(x, y)$ is searched and compared to the same correlation area in a previously captured frame, $P_m(x, y)$. A correlation function $C(x, y)$ may be calculated according to Eq. 7, which is the sum of the squares of the pixel differences between $P_k(x, y)$ and $P_m(x, y)$.

$$C(x,y) = \sum_{i,j} [P_k(i,j) - P_m(i+x, j+y)]^2 \qquad \text{(Eq. 7)}$$

where i,j are bounded by the selected correlation area. To find the correlation point, the correlation process identifies an (x, y) coordinate in the correlation area of the current frame $P_k(x,y)$ at which the correlation function $C(x, y)$ is a minimum. In effect, according to Eq. 7, an (x,y) coordinate is selected in the current frame $P_k$ and frame $P_k$ is moved with respect to the frame $P_m$ in the correlation area A to find a coordinate (x,y) that produces a minimum for $C(x,y)$.

Although in some embodiments the correlation function $C(x,y)$ of Eq. 7 may be used, other correlation functions are also contemplated from which a mapping point can be selected by calculating a minimum or maximum.

The technique described may provide several benefits. First, the search from the corners that follows the zigzag path of FIG. 3 in one embodiment minimizes the search time for finding adequate mapping points and yielding maximal transform area. Further, by utilizing feature-rich mapping points, white space or ambiguous regions of the image are automatically eliminated.

As discussed earlier, there are six degrees of freedom in the motion between any two successive video frames. However, because of the relatively fast capture of frames, the movement between any two successive frames is small and thus the maximum (or minimum depending on the correlation function) over the selected small correlation region A accurately defines the inter-frame motion of translation, rotation, perspective and/or scaling.

Once a mapping point is found, a correlation error and redundancy error check may be performed (step 115). Redundancy error is a result of selecting a correlation point on one image that could be mapped to several points on another image, thereby not producing a unique point. This may result from repetitive patterns in the images, which may include camera characteristics such as interlacing. To determine if redundant detail exists, correlation data is analyzed over the correlation area A. If this analysis indicates multiple minima of the same magnitude in correlation value, then redundancy has been detected. If the selected mapping point is a redundant mapping point, then it may be discarded as a mapping point.

Figure 4:
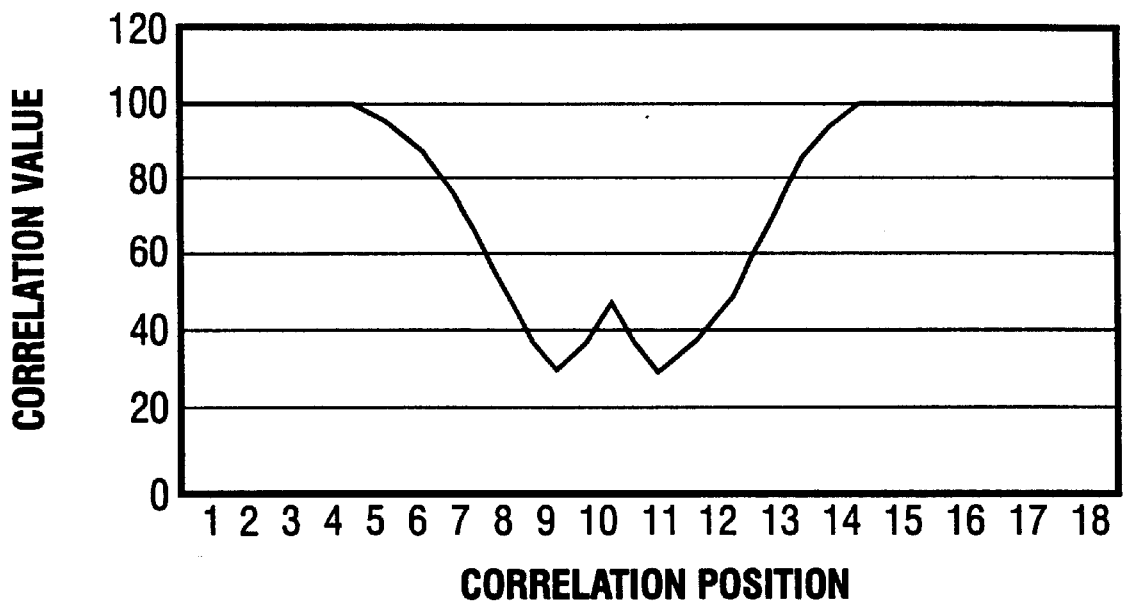
FIGS. 4 and 5 are charts of correlation function values calculated by comparing two images in the image stitching process.

The chart shown in FIG. 4 is a simplified chart of correlation illustrating the existence of redundant detail. Although the redundancy analysis involves a two-dimensional calculation, the one-dimensional correlation illustrated in the chart of FIG. 4 provides a simple illustration of how the redundancy error detection is performed. FIG. 4 shows the result of a horizontal search (in the x direction) in which redundant detail causes two minima when two images $P_k$ and $P_m$ are compared by calculating the correlation function $C(x, y)$ according to Eq. 7. The technique includes finding the minimum of the correlation function and setting a threshold that is slightly larger than the minimum value. The same concept and technique is extended to the two-dimensional case, in which a search is performed both in the x and y directions.

A method according to one embodiment for determining a threshold and number of minima includes selecting a predetermined threshold that is a set value (e.g. 33%) greater than the minimum value of $C(x, y)$ found in the correlation area A. If the threshold value used results in too many minima, then the threshold can be reduced until the number is manageable. Once a good set of minimum values is determined, the stitching program 16 may confirm if each is a minimum by searching all correlation points around it to make sure it is the lowest point in the area. If it is, then a true minimum has been found. If the number of true minima is greater than one per direction (x, y directions), then redundancy has been detected and the selected mapping point cannot be used.

Figure 5:
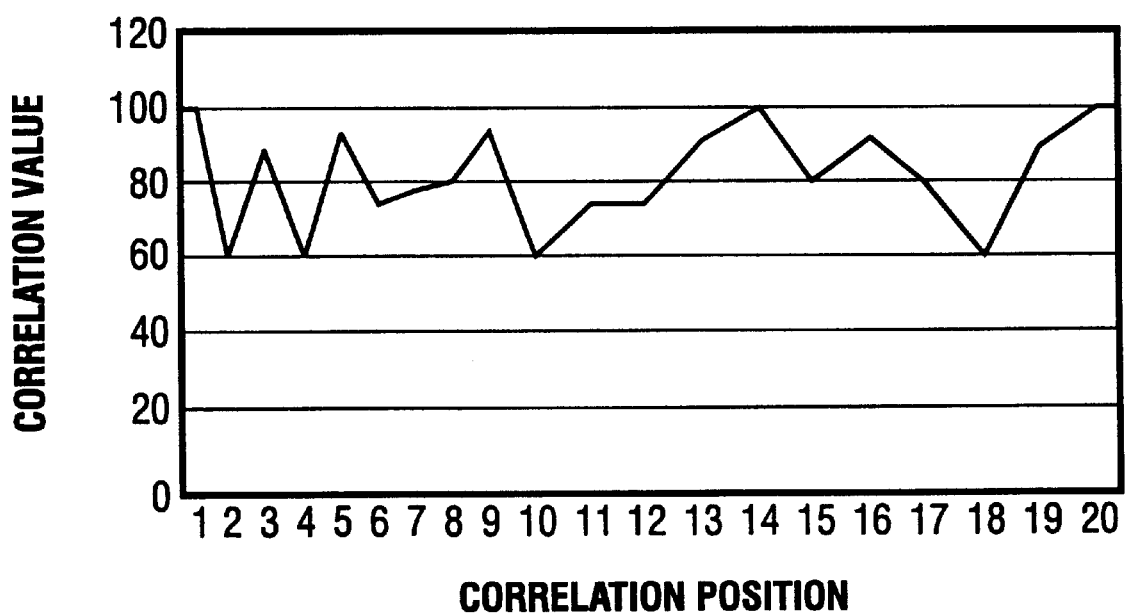

The stitching program 16 in step 115 may also check to determine if the correlation has failed. Correlation failure detection is similar to redundancy failure detection (x or y). If the correlation areas of two images are mismatched, there would be no discernable minimum, which may result in multiple, unequal minima. Thus, determining the number of minima found in the selected correlation area provides a way to validate if the correlation was successful or not. The chart shown in FIG. 5 illustrates what the correlation data could look like if the correlation was unsuccessful.

If the point correlation is unsuccessful due either to a detected redundancy error or a correlation error (step 116), then a new correlation area is selected (step 113) to find a new mapping point (steps 110, 112, 114, 115). However, if the point correlation is indicated as being successful (step 116), then the stitching program 16 determines if enough mapping points (e.g., 4) are selected to perform the perspective transform or projective mapping (step 118). If not, the process starts from another corner of the image to find another feature-rich area to find the next mapping point and to correlate the point (steps 110, 112, 113, 114, 115, and 116).

Given a correlation point at $(x_M, y_M)$ that has been calculated by moving one image (e.g., $P_k$) over a second image (e.g., $P_m$), the stitching program 16 may optionally search for a sub-pixel position (a position located between two pixels) that provides even better correlation. The pixel located at $(x_M, y_M)$, which has a better correlation than its neighbors, may be referred to as the maximal pixel. Aligning the images at this pixel provides a better match then at any other pixel, but in general, alignment of the images $P_k$ and $P_m$ at a fractional pixel offset may provide better alignment.

To find this sub-pixel position, a 3×3 array of pixels defined by pixel positions $(X_L, x_M, x_R)$ and $(y_T, y_M, y_B)$ is identified. In the x direction $(x_L, x_M, x_R)$ represents the x-positions of the maximal pixel and its two neighbors. Similarly, $(y_T, y_M, y_B)$ represents the y-positions of the maximal pixel and its top and bottom neighbors. In the middle column of the 3×3 array, correlation values $C_T$, $C_M$, and $C_B$ are defined at positions $(x_M, y_T)$, $(x_M, y_M)$ and $(x_M, y_B)$, respectively. Similarly, in the middle row of the 3×3 array, correlation values $C_L$, $C_M$, and $C_R$ are defined at positions $(x_L, y_M)$, $(x_L, y_M)$, and $(x_R, y_M)$, respectively. Since $C_M$ is a minimum in the entire correlation area, it will have a value less than $C_L$, $C_R$, $C_T$, and $C_B$. Thus, to calculate a sub-pixel position that may provide better alignment than the $(x_M, y_M)$ position, the mapping point (x,y) may be modified according to Eqs. 8 and 9.

$$x = x_M + \frac{C_L - C_R}{2C_L - 4C_M + 2C_R}, \quad \text{(Eq. 8)}$$

$$y = y_M + \frac{C_B - C_T}{2C_B - 4C_M + 2C_T}, \quad \text{(Eq. 9)}$$

where x is computed from positions $(x_L, y_M)$, $(x_M, y_M)$ and $(x_R, y_M)$ by using the correlation values $(C_L, C_M$ and $C_R)$, while y is computed from position $(x_M, y_B)$, $(x_M, y_M)$, $(x_M, y_T)$ by using the correlation values $(C_B, C_M$ and $C_T)$. After the mapping points are selected, the perspective transform is performed (step 120). The current frame $P_k$ is mapped using the perspective transform back to a reference frame, which in some embodiments may be the first frame $P_l$.

In a perspective transform, the forward mapping function may be defined by Eqs. 10 and 11.

$$x = \frac{a_{11}u + a_{21}v + a_{31}}{a_{13}u + a_{23}v + a_{33}}, \text{ and} \quad \text{(Eq. 10)}$$

$$y = \frac{a_{12}u + a_{22}v + a_{32}}{a_{13}u + a_{23}v + a_{33}}, \quad \text{(Eq. 11)}$$

where (x,y) is the coordinate of the current frame $P_k$; (u,v) is the coordinate of the reference frame $P_l$; and the nine coefficients $a_{ij}$ (i=1–3, j=1–3) define a 3×3 matrix T that represents the transform.

$$T = \begin{bmatrix} a_{11} & a_{12} & a_{13} \\ a_{21} & a_{22} & a_{23} \\ a_{31} & a_{32} & a_{33} \end{bmatrix} \quad \text{(Eq. 12)}$$

Without loss of generality, the matrix T can be normalized so that the coefficient $a_{33}$ is set to unity ($a_{33}$=1). This leaves eight degrees of freedom for the projective mapping. The eight coefficients can be determined by establishing correspondence between four points in the reference frame $P_l$ and the current frame $P_k$. Let $(u_n, v_n)$ and $(x_n, y_n)$, for n=0, 1, 2, 3 be these four points in the $P_l$ and $P_k$ frames, respectively, and assuming $a_{33}$=1, Eqs. 10 and 11 will yield $$x = a_{11}u + a_{21}v + a_{31} - a_{13}ux - a_{23}vx, \quad \text{(Eq. 13)}$$

$$y = a_{12}u + a_{22}v + a_{32} - a_{13}uy - a_{23}vy. \quad \text{(Eq. 14)}$$

Applying these new x, y equations (13 and 14) to the four pairs of corresponding points in frames $P_l$ and $P_k$ yields an 8×8 system, as shown in Eq. 15.

$$X = \begin{bmatrix} u_0 & v_0 & 1 & 0 & 0 & 0 & -u_0x_0 & -v_0x_0 \\ u_1 & v_1 & 1 & 0 & 0 & 0 & -u_1x_1 & -v_1x_1 \\ u_2 & v_2 & 1 & 0 & 0 & 0 & -u_2x_2 & -v_2x_2 \\ u_3 & v_3 & 1 & 0 & 0 & 0 & -u_3x_3 & -v_3x_3 \\ 0 & 0 & 0 & u_0 & v_0 & 1 & -u_0y_0 & -v_0y_0 \\ 0 & 0 & 0 & u_1 & v_1 & 1 & -u_1y_1 & -v_1y_1 \\ 0 & 0 & 0 & u_2 & v_2 & 1 & -u_2y_2 & -v_2y_2 \\ 0 & 0 & 0 & u_3 & v_3 & 1 & -u_3y_3 & -v_3y_3 \end{bmatrix} B, \quad \text{(Eq. 15)}$$

where A=$[a_{11}\ a_{21}\ a_{31}\ a_{12}\ a_{22}\ a_{32}\ a_{13}\ a_{23}]$ are the unknown coefficients, and X=$[x_0\ x_1\ x_2\ x_3\ y_0\ y_1\ y_2\ y_3]$ are the known coordinates of the selected mapping points in the current frame $P_k$. Once the coefficients $a_{ij}$ (i=1–3, j=1–3) are determined, the matrix T is known and can be used to perform the mapping of the frame $P_k$ to the reference frame $P_l$. The mapping performed using Eqs. 13 and 14 is done on a pixel-by-pixel basis.

At the kth frame, a set of k–1 transforms $T_j$ (j=1, ..., k–1) has been created to map the frame $P_k$ back to the coordinates of $P_l$. The transforms $T_j$ (j=1, ..., k–1) are multiplied together to form a resultant transform that is applied to $P_k$. The aligned frame $P_k$ is then added to the composite image using known techniques.

Next, for the given frame $P_k$, the accumulated errors of the perspective transforms may be calculated and error correction performed in the error correction phase (step 122). The next frame $P_{k+1}$ is then retrieved and the frame processed (step 100).

Figure 6:
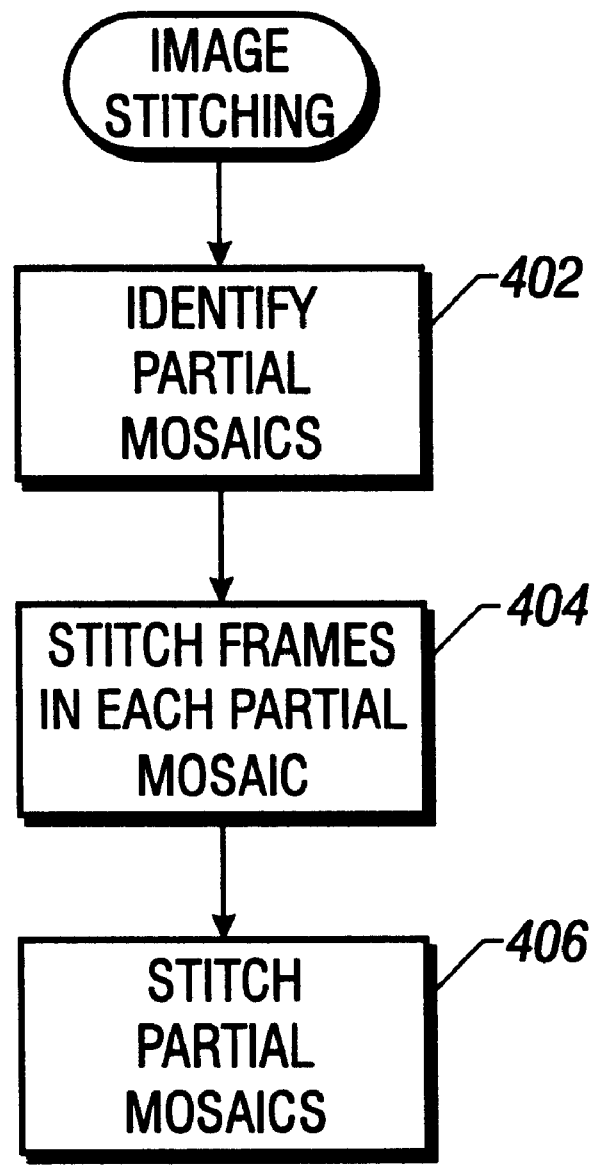
FIG. 6 is a flow diagram of an image stitching process according to another embodiment that includes identifying partial mosaics.

Referring to FIG. 6, to further improve the accuracy of the stitching process, the stitching program 16 according to some embodiments may first group the captured frames (step 402) into multiple strips according to the direction in which the camera 12 is scanned over the target scene. From these strips, partial mosaics each including a subset of all the captured frames may be constructed.

The perspective transforms described above may then be applied to these partial mosaics to stitch the partial mosaics together to form a final mosaic. After the partial mosaics are identified, the correlation process of FIG. 2 is performed to stitch together frames in each partial mosaic (step 404). After the frames in each partial mosaic have been aligned and combined, each partial mosaic is then treated as any ordinary frame, and the partial mosaics are stitched together using the process described above (step 406). A new set of perspective transforms are derived to align the partial mosaics for placement in the final mosaic.

Accumulated correlation error is proportional to the number of images processed. By breaking the total number of images into multiple sets (the partial mosaics), the accumulated correlation error may be reduced.

Figure 7:
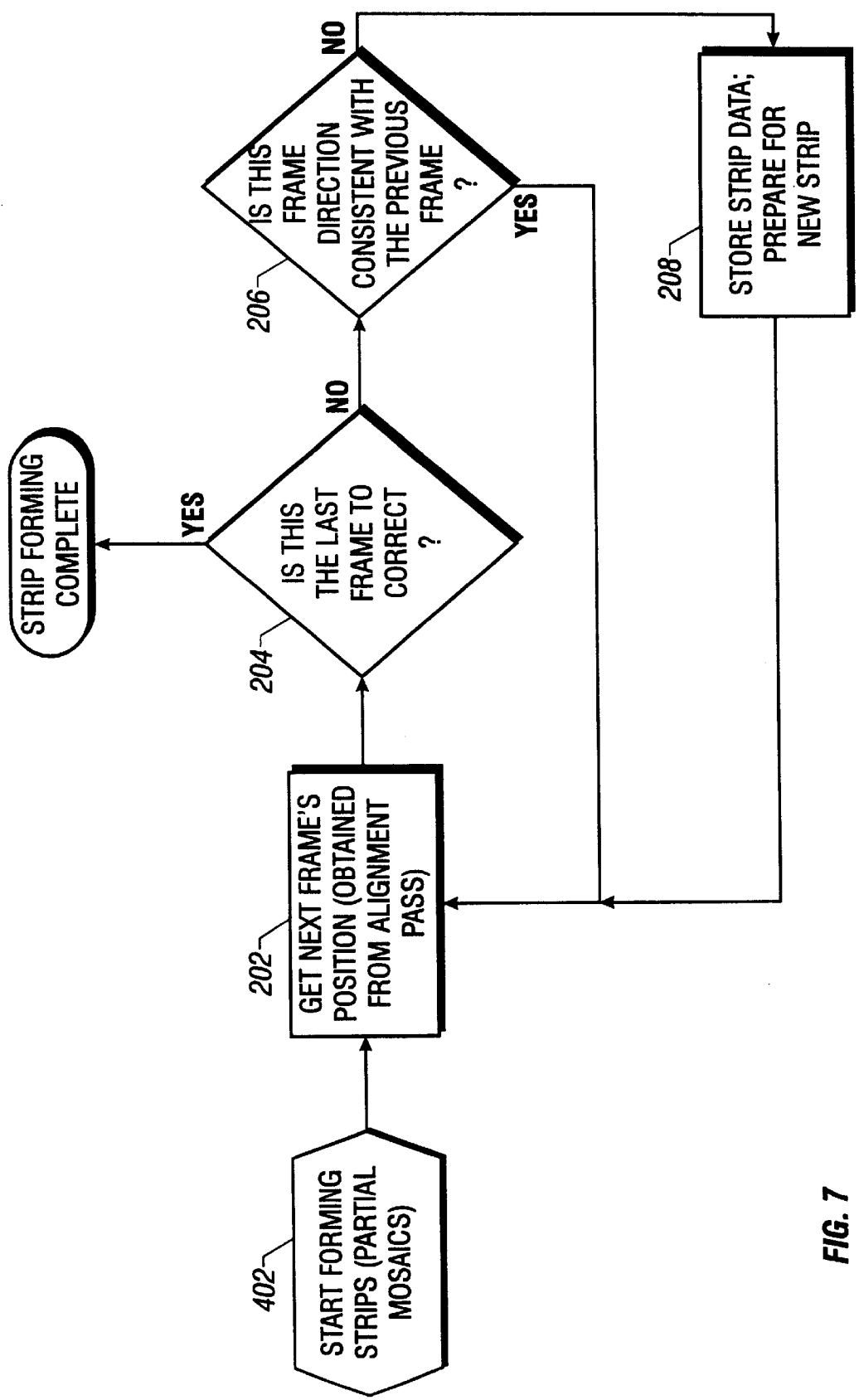
FIG. 7 is a flow diagram of a process for grouping captured images into partial mosaics.

Referring to FIG. 7, to group the scanned frames into partial mosaics (step 402), the stitching program 16 according to some embodiments first obtains the position of the next frame (step 202), which may be the position of a corner of the frame or at the center of the frame. Next, the program 16 determines if the frame obtained is the last frame (step 204), and if so, the frame is stored in the current partial mosaic and the process is completed.

However, if the frame is not the last frame, then the program 16 determines if the direction of the current frame $P_k$ is consistent with the previous frame $P_{k-1}$ (step 206). If not, then the partial mosaic has ended. The frame $P_k$ is stored in a new partial mosaic (step 208) and the position of the next frame $P_{k+1}$ is retrieved (step 202). However, if the direction of the current frame $P_k$ is consistent with the previous frame $P_{k-1}$, the frame $P_k$ is stored in the current partial mosaic and the next frame is retrieved.

Figure 8:
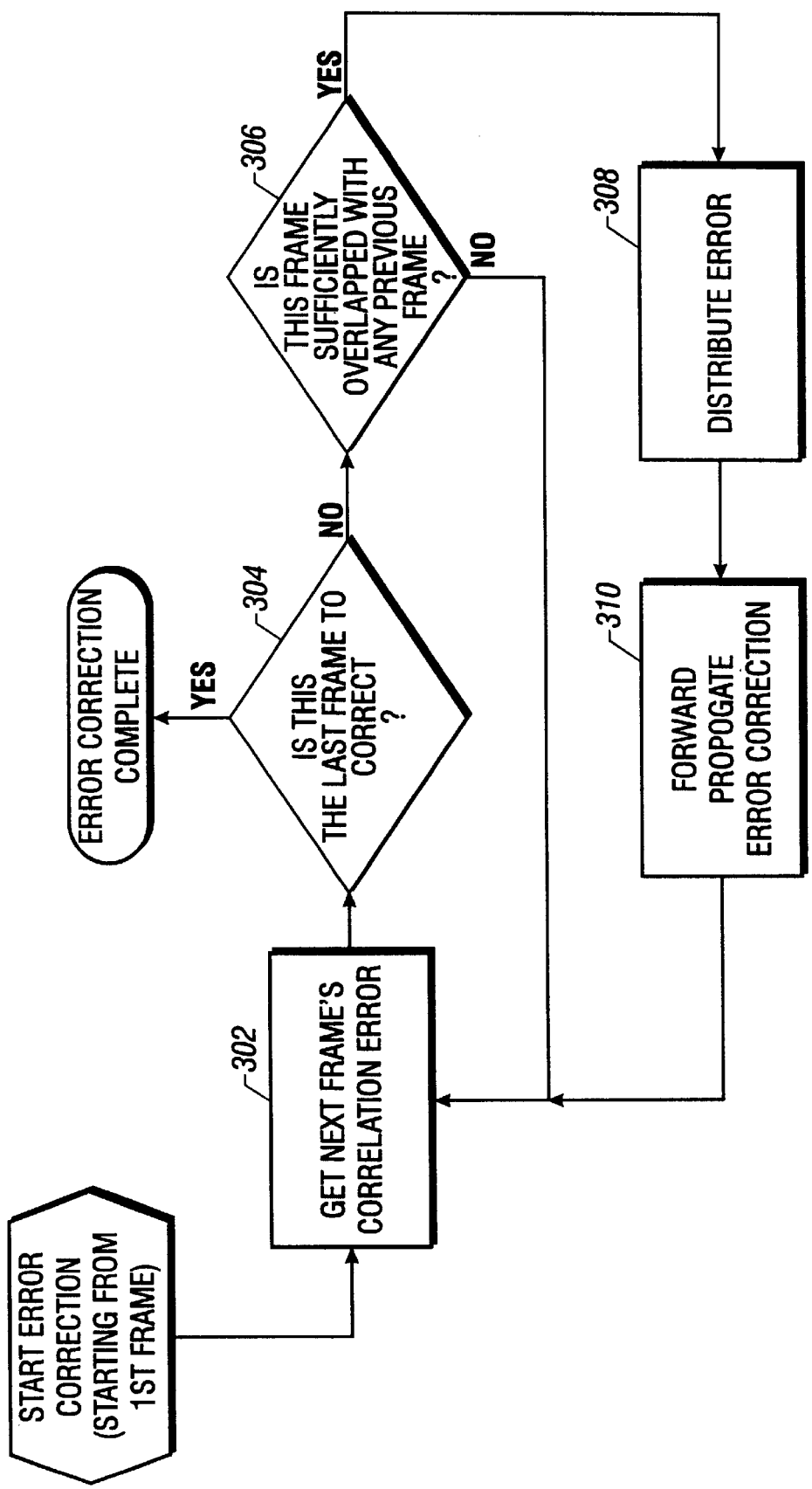
FIG. 8 is a flow diagram of a process for detecting and distributing residual errors.

Referring to FIG. 8, a flow for detecting and distributing residual errors is illustrated. To scan in a scene, the user may be instructed to end the image scan where he or she began. In this way, the first and last frames $P_l$ and $P_N$ should overlap. Applying all intermediate projective transforms to the last frame $P_N$ should thus in theory make $P_N$ align perfectly with the first frame $P_l$. However, slight errors (e.g., on the order of a fraction of a pixel) may occur in the calculation of each transform $T_j$. If the number N of captured images is large, slight errors will accumulate to significant values as the transforms $T_l, ..., T_N$ are multiplied.

This alignment error (referred to as the "residual alignment error") is calculated and stored in a residual transform R. The matrix R represents the residual transformation and is defined by Eq. 16.

$$R = \begin{bmatrix} 1+\delta_{11} & \delta_{12} & 0 \\ \delta_{21} & 1+\delta_{22} & 0 \\ \delta_{31} & \delta_{32} & 1 \end{bmatrix} \quad \text{(Eq. 16)}$$

If N frames are captured, then a matrix F is defined as the Nth root of R as approximated by Eq. 17

$$F = \begin{bmatrix} 1+\frac{\delta_{11}}{N} & \frac{\delta_{12}}{N} & 0 \\ \frac{\delta_{21}}{N} & 1+\frac{\delta_{22}}{N} & 0 \\ \frac{\delta_{31}}{N} & \frac{\delta_{32}}{N} & 1 \end{bmatrix} \quad \text{(Eq. 17)}$$

where $\delta_{ij}$ (i=1–3, j=1–2) represent the amount of the accumulated errors of the coefficients $a_{ij}$ (i=1–3, j=1–3), respectively. Because the accumulated errors are small, R is close to identity and the product of any two $\delta_{ij}$s is negligible. As a result, the derived matrix F is a close approximation of the Nth root of R.

To perform the error correction, the stitching program 16 starts at the first frame and retrieves the correlation error ($F^i$) for the next frame $P_i$ (step 302). Next, the program 16 checks if the frame is the last frame to correct (step 304), and if so, the error correction process is completed. If not, the program 16 analyzes to determine if the current frame $P_i$ is sufficiently overlapped with any of previous frames ($P_i$ to $P_l$). Whether a frame P is sufficiently overlapped with a previously captured frame may be predetermined or dynamically set based on prior correlations. If there is not sufficient overlap, then error correction is not needed on the frame $P_i$ and the next frame correlation error is retrieved (step 302).

However, if sufficient overlap exists between $P_i$ and one of $P_l$–$P_{i-l}$ (referred to as $P_x$), then the correlation error $F^i$ is applied to the transform $T_{x,i}$ which represents the transform from frame $P_x$ to $P_i$, according to Eq. 18.

$$T_{x,i} \leftarrow F^i T_{x,i}. \quad \text{(Eq. 18)}$$

In this manner, the residual error R is distributed uniformly over all intermediate projective transformations by modifying each transform T. The error correction is forward propagated by passing the corrected transform $T_{x,i}$ for further corrections (step 310). After this modification of the transforms T, the first and last frames $P_l$ and $P_N$ will become perfectly aligned.

Figure 9:
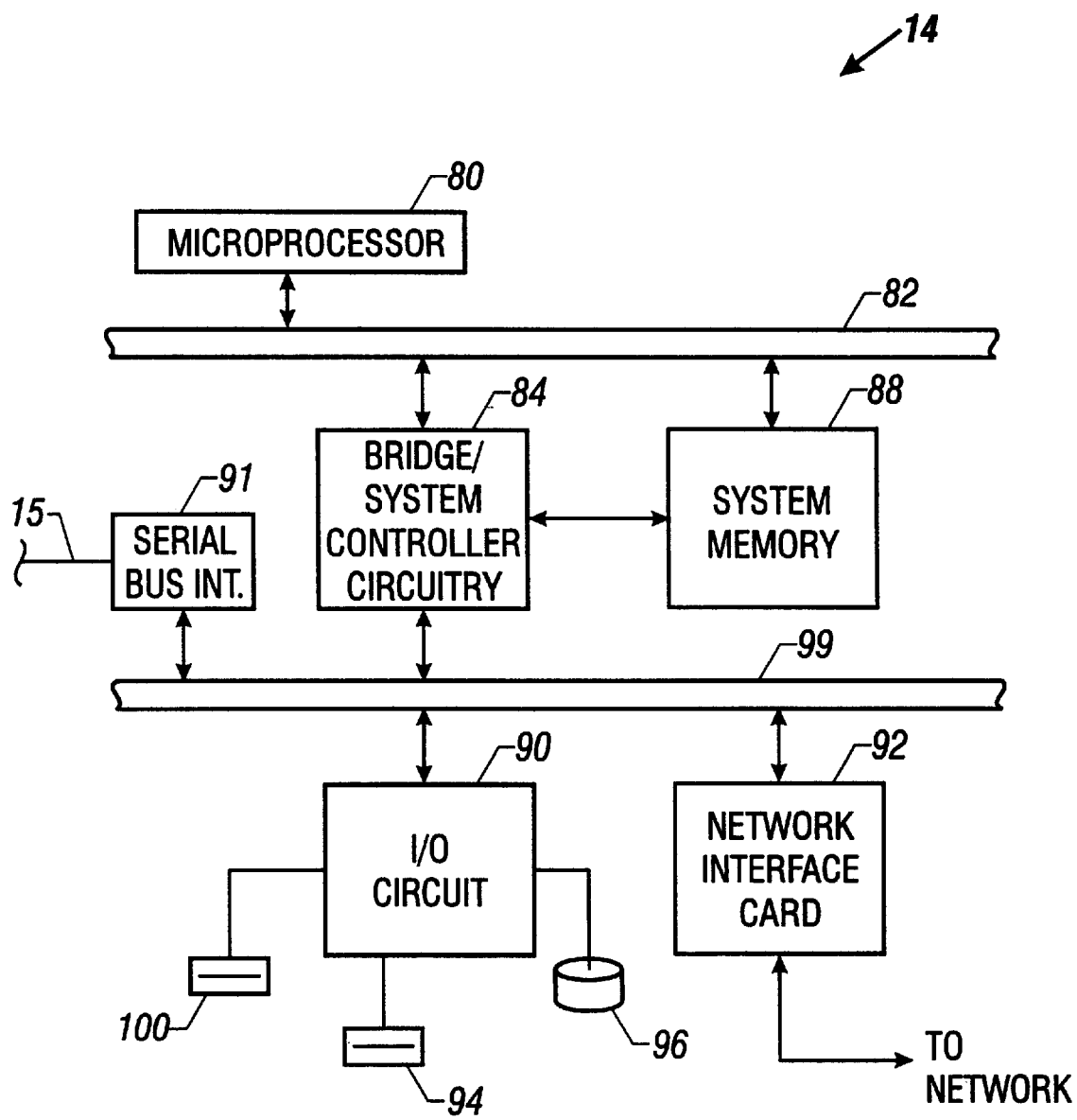
FIG. 9 is a block diagram of a computer system that may be used in the digital imaging system of FIG. 1 and in which stitching programs according to embodiments of the invention may be run.

Referring to FIG. 9 in some embodiments, the computer 14 may include a microprocessor 80 that runs the stitching program 16 according to embodiments of the invention. The system memory 88, the microprocessor 80, and the bridge/system controller circuitry 84 are all coupled to a host bus 82. The bridge circuitry 84 provides an interface from the host bus 82 to a downstream bus 99 that is coupled to an I/O controller 90 and a network interface card at 92, as examples. The computer 14 may also have, as examples, a CD-ROM or DVD-ROM drive 100, a floppy disk drive 94, and/or a hard disk drive 96.

According to some embodiments, the stitching program 16 may be stored on a suitable mass storage medium, such as the CD-ROM or DVD-ROM drive 100, the floppy disk drive 94, or the hard disk drive 96. During execution, the program 16 or portions of the program 16 may be loaded into the system memory 88 for execution by the microprocessor 80. In addition, the captured frames may be stored in one of the listed storage media or in the camera 12, or alternatively, in an external location.

Figure 10:
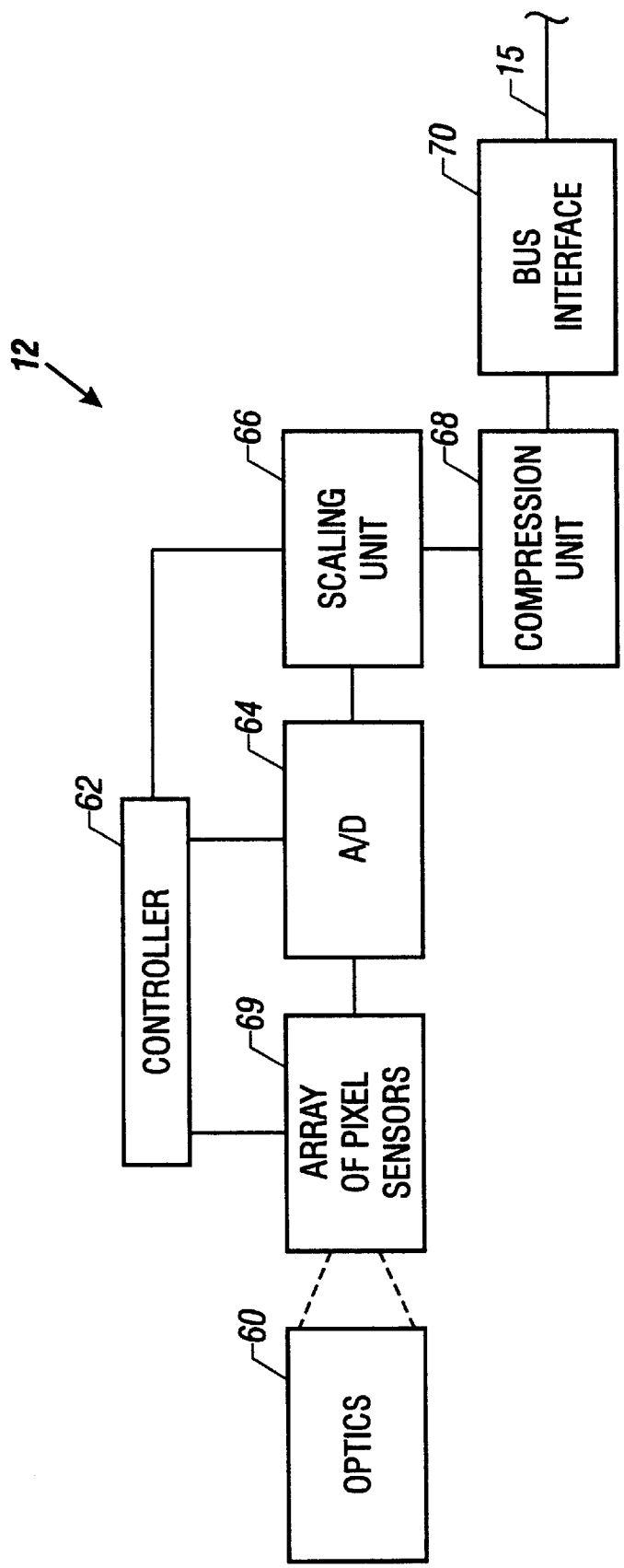
FIG. 10 is a block diagram of a digital camera that may be used in the digital imaging system of FIG. 1.

Referring to FIG. 10, the camera 12, in some embodiments, includes optical components 60 that focus an optical image to be captured onto an array of pixel sensors 69 (e.g., a CMOS pixel sensor array) which electrically captures the image. Under control of a controller 62, an analog-to-digital (A/D) converter 64 receives analog signals from the sensor array 69 and furnishes the signals to other components in the camera 12 for further processing. These other components may include a scaling unit 66 that scales the resolution of the captured frame, if desired, and a compression unit 66 to compress the size of the frame that is transmitted over the communication link 15 through a bus interface 70.

In some embodiments, the stitching program 16 or a portion of the stitching program may be executed in the digital camera 12 by the controller 62, with the camera 12 in effect becoming the computer that is capable of running the stitching program. In such cases, the computer system 14 may not be required.

While the invention has been disclosed with respect to a limited number of embodiments, those skilled in the art will appreciate numerous modifications and variations therefrom. It is intended that the appended claims cover all such modifications and variations as fall within the spirit and scope of the invention.

What is claimed is:

1. A digital imaging system comprising:
    an imaging device to capture a plurality of images representing a scene;
    a processor; and
    a program executable on the processor to:
        identify high detail regions in each image;
        identify mapping points in the high detail regions;
        perform projective mappings of the images using the identified mapping points to align the images; and
        combine the images into a composite image that represents the scene.

2. The digital imaging system of claim 1, wherein the program is further executable to identify a high detail region by measuring the amount of detail in a selected region in each image.

3. The digital imaging system of claim 2, wherein the program is further executable to move the selected region along a predetermined path through the image until a region having a minimum amount of detail is found.

4. The digital imaging system of claim 3, wherein the predetermined path starts in a corner of the image and follows a spiral pattern.

5. The digital imaging system of claim 1, wherein the program is further executable to correct accumulated error resulting from performing the projective mappings of the captured images.

6. The digital imaging system of claim 5, wherein the accumulated error is distributed over all intermediate projective mappings.

7. The digital imaging system of claim 1, wherein the program is executable to select mapping points in each image based on a comparison of high-detail regions between two images.

8. The digital imaging system of claim 7, wherein a correlation function is calculated in the comparison, and the mapping point is selected if a minimum is found.

9. The digital imaging system of claim 8, wherein the program is further executed to indicate a correlation error if a minimum of the correlation function cannot be found.

10. The digital imaging system of claim 8, wherein the program is further executable to indicate a redundancy error if more than one minima of the correlation function is found.

11. The digital imaging system of claim 7, wherein the program is further executable to select four mapping points in each image.

12. The digital imaging system of claim 1, wherein the program is executable to align the images with respect to a reference image.

13. The digital imaging system of claim 1, wherein the program is further executable to automatically identify the mapping points in the high detail regions.

14. A computer-readable storage medium in a digital imaging system having a camera, the storage medium containing a program comprising instructions for causing the system to:
    receive a plurality of digitized images each representing a portion of a scene;
    identify mapping points in feature-rich regions of each image;
    align the images based on the mapping points in each image to compensate for misalignment caused by movement of the camera; and
    combine the images to form a composite image representing the scene.

15. The computer-readable storage medium of claim 14, wherein the program further comprises instructions to cause the system to align the images by performing perspective transforms of the images using the identified mapping points.

16. The computer-readable storage medium of claim 14, wherein the program further comprises instructions to cause the system to identify the feature-rich regions in each image.

17. The computer-readable storage medium of claim 16, wherein the program further comprises instructions to cause the system to compare a feature-rich region in a first image with a corresponding region in a second image, and to select a mapping point based on the comparison.

18. The digital imaging system of claim 14, wherein the program is further executable to automatically identify mapping points in feature-rich regions of each image.

19. In a digital imaging system, a method of generating a high resolution image representing a target scene, the method comprising:
    capturing, using an imaging device, multiple images each representing a portion of the target scene;
    a program running in the digital imaging system aligning the images to remove misalignment due to movement of the imaging device; and
    the program combining the images to form a composite image representing the scene,
        wherein aligning the images comprise identifying a feature-rich region by selecting a predetermined region and moving the predetermined region along a predetermined path in the image until a predetermined amount of detail is found.

20. The method of claim 19, wherein the multiple images are captured in rapid succession.

21. The method of claim 19, further comprising scanning the camera across the target scene and capturing the images at a high rate to reduce the amount of movement of the camera between any two successive images.

22. The method of claim 19, wherein aligning the images further comprises identifying a mapping point in the feature-rich region in each image.

23. A digital imaging system comprising:
   an imaging device to capture a plurality of images representing a scene;
   a processor; and
   a program executable on the processor to:
   group the captured images into partial mosaics;
   automatically identify mapping points in high details regions in each image of each partial mosaic;
   align images based on mapping points in each image of each partial mosaic;
   combine the images in each partial mosaic; and
   combine into partial mosaic into a composite image that represents the scene.

24. The digital imaging system of claim 23, wherein the program is further executable to align the partial mosaics with respect to each other.

25. The digital imaging system of claim 23, wherein the program is further executable to stitch the partial mosaics into the composite image that represents the scene.

* * * * *